United States Patent [19]

Nikolai

[11] 4,421,726

[45] Dec. 20, 1983

[54] METHOD OF POLLUTION CONTROL INVOLVING THE ABSORPTION OF SULFUR DIOXIDE FROM STACK GASES

[76] Inventor: William L. Nikolai, Platteville, Wis.

[21] Appl. No.: 390,383

[22] Filed: Jun. 21, 1982

[51] Int. Cl.³ .................... C01B 17/00; C01F 1/00; C01F 3/00
[52] U.S. Cl. ................................ 423/242; 423/111; 423/127; 423/131; 423/339; 423/522; 423/539; 204/98; 204/104
[58] Field of Search ............... 423/249 A, 242 R, 131, 423/111, 522, 539, 572 A, 127, 339, 338; 204/180 P, 98, 104

[56] References Cited

U.S. PATENT DOCUMENTS

| | | | |
|---|---|---|---|
| 1,891,608 | 12/1932 | Scheidt | 423/131 |
| 4,082,835 | 4/1978 | Chlanda et al. | 423/242 |
| 4,130,627 | 12/1978 | Russ et al. | 423/127 |
| 4,162,299 | 7/1979 | Takeyama et al. | 423/242 |
| 4,307,069 | 12/1981 | Lurie | 423/242 |

Primary Examiner—Gregory A. Heller
Attorney, Agent, or Firm—Fitch, Even, Tabin & Flannery

[57] ABSTRACT

A process for removing sulfur dioxide from effluent gas and for recovering amphoteric components such as alumina from solid inorganic combustion byproducts.

6 Claims, 2 Drawing Figures

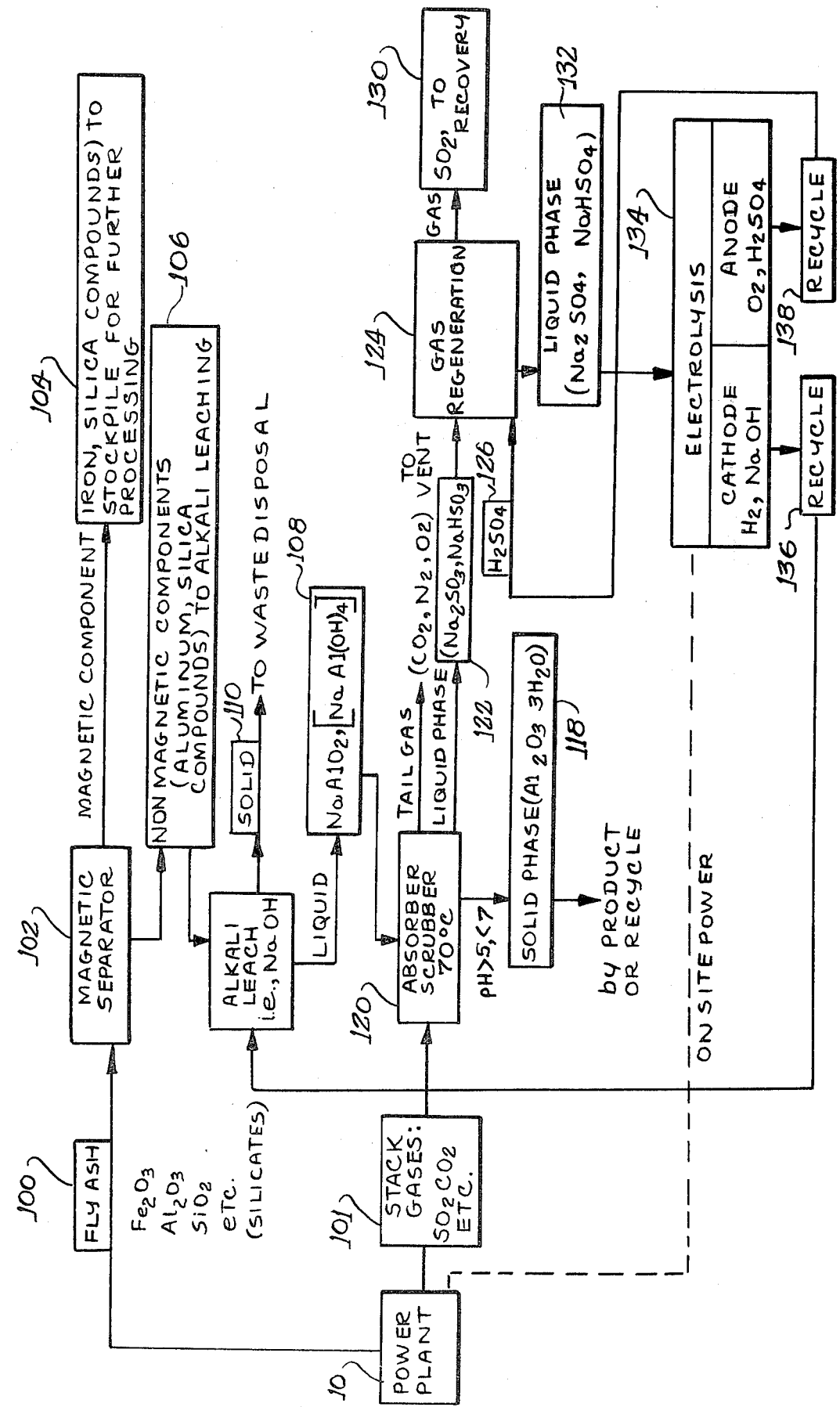

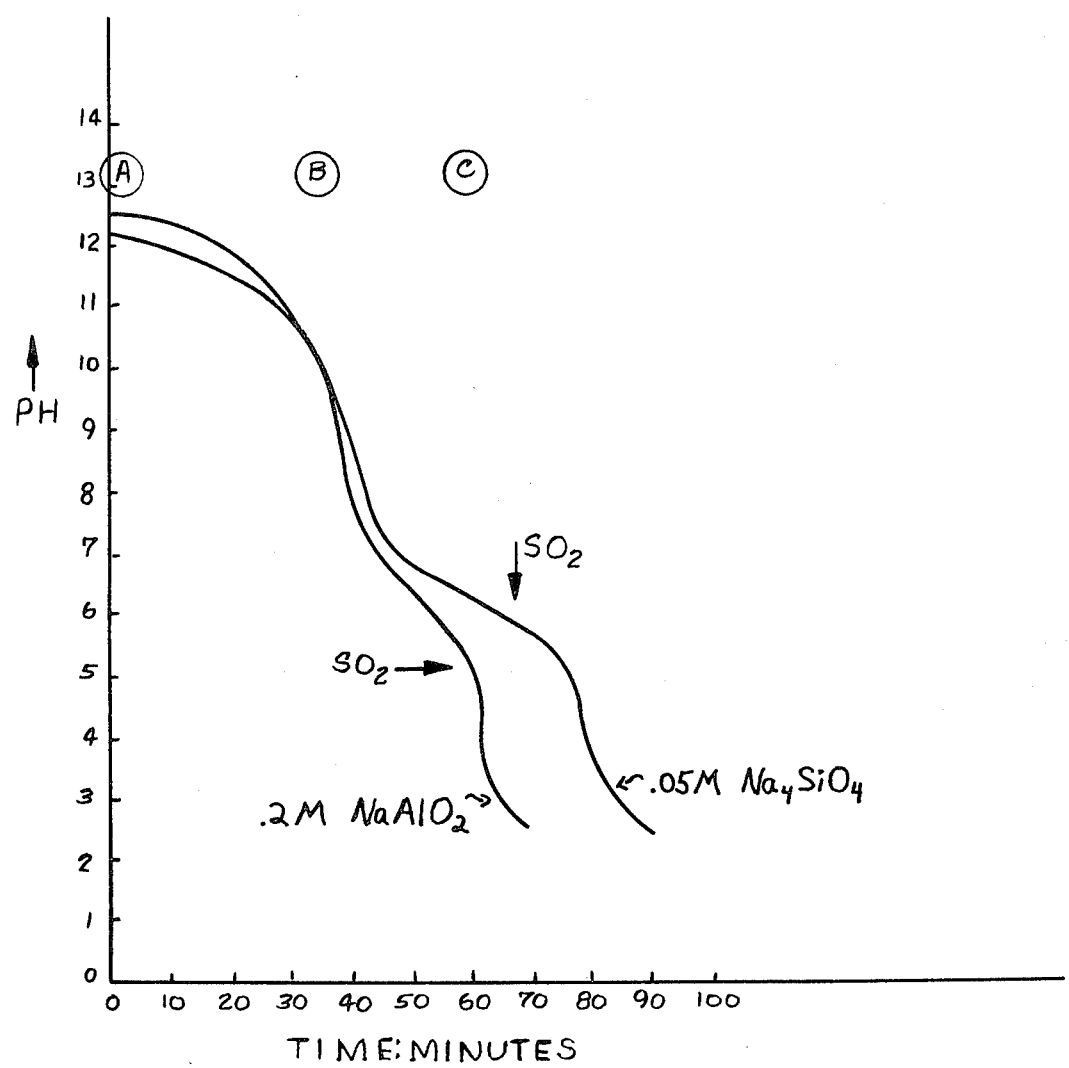

METHOD OF POLLUTION CONTROL INVOLVING THE ABSORPTION OF SULFUR DIOXIDE FROM STACK GASES

The present invention is directed to methods and apparatus for pollution control and resource recovery, and, more particularly, is directed to such methods and apparatus for recovering mineral values for combustion byproducts and for removing sulfur dioxide from combustion gases.

One of the major problems related to the generation of electrical power using fossil fuels as the energy source is the substantial environmental pollution problem posed by the presence of sulfur dioxide in the combustion product effluent gases, which may hereinafter be referred to as "stack" gases. One approach to this problem has been to use low sulfur content petroleum or coal. However, the sources of low sulfur fuels are limited to the extent that such fuels are relatively more expensive than higher sulfur content fuels and are found principally in the western part of the country. In view of the transportation problem and higher cost of low sulfur fuels, the use of high sulfur fuels for the production of power is becoming a necessity. The removal of sulfur dioxide for purification of effluent gases from sulfide roasting processes is also an area of increasing importance. Accordingly, a considerable amount of effort has recently been directed toward processes for removal of sulfur dioxide from stack gases on a scale substantially exceeding such efforts in the past.

Conventional approaches to the removal of sulfur dioxide from gas mixtures have included the use of soluble bases such as sodium hydroxide and ammonium hydroxide, insoluble bases such as calcium hydroxide and magnesium hydroxide in aqueous slurries, and oxides and mixtures of oxides such as calcium oxide, magnesium oxide, iron oxide, and manganese oxides in dry solid state or in aqueous slurries. Various inorganic carbonates, phosphates, and salt solutions, such as described in my U.S. Pat. No. 3,886,259, as well as organic compounds such as amines and citrates have also been used or proposed in connection with sulfur dioxide control.

However, conventional methods of sulfur dioxide removal have various disadvantages. In this regard, a substantial amount of effort has been directed to limestone absorption techniques in which the sulfur dioxide from stack gases is absorbed by limestone under aqueous conditions to produce calcium sulfite. Some air oxidation may take place, so that the byproducts of limestone absorption processes are a mixture of calcium sulfite and calcium sulfate. Limestone scrubbers based on limestone absorption processes have had difficulties involving scaling and fouling of the scrubbers by post-precipitation of calcium sulfate and calcium sulfite, and lack of efficient and stoichiometric quantitative absorption of sulfur dioxide. In addition to the technical difficulties encountered during the limestone absorption processes and with the efficiency of the absorption by limestone, there is the difficulty of obtaining a grade of limestone high in calcium carbonate content. In this connection, for example, magnesium carbonate content in the limestone may present an additional pollution problem due to the water solubility of reaction byproduct magnesium sulfate. Limestone scrubbers also present the problem of the disposal of large amounts of solid sulfite-sulfate waste. Such wastes require a large land surface area for disposal.

The enormity of the waste disposal and secondary pollution problems may be considered in connection with the requirements for a conventional coal burning facility. Assuming a one percent coal sulfur content, it may be calculated that for a 1,000 megawatt power generation facility, over 400 tons per day of calcium sulfite-sulfate waste may be produced by a 100% efficient absorption process. It has been reported that a 1,000 megawatt plant may produce 1,600 tons per day of calcium sulfate waste. While a reductive decomposition process may potentially be used to regenerate calcium oxide absorbant from the calcium sulfite-sulfate waste, such approaches involve additional capital expense, and, of course, do not solve various of the other technical problems inherent in the limestone absorption processes.

Also as indicated hereinabove, various oxides of manganese have been proposed for sulfur dioxide absorption. However, conventional processes involving the use of manganese minerals and oxides in a cyclic manner have presented other problems even though they may tend to alleviate the disposal problem of waste materials referred to in connection with limestone absorption processes. Various of the processes involving aqueous slurries of a manganese-based absorber have reaction velocities which vary from material to material and are deficient in sulfur dioxide absorption capability, and, in any event, tend to be slow, which does not facilitate large-scale operations. Moreover, regeneration of the manganese absorber from the manganese sulfate absorption product produced in various of the conventional processes has involved the use of material treatment at temperatures as high as 900° C. Heat energy input is also required for the concentration by evaporation and crystallization of the hydrate of manganous sulfate, which adds further processing expense. Systems utilizing manganous hydroxide have been developed which do not require high temperature treatment, as disclosed in my U.S. Pat. No. 4,076,793.

In various other processes, slurry separation steps are difficult due to the colloidal nature of some of the materials used as absorbers. For example, iron oxides and freshly precipitated hydrated oxides of iron present handling difficulties due to the colloidal nature of these materials.

Power generating facilities which use coal as the source of energy also produce considerable amounts of solid combustion byproducts such as flyash, slag and/or clinker, which may generally be referred to herein as solid inorganic combustion byproducts in addition to the undesirable sulfur dioxide content of the combustion gases.

The disposal of these solid inorganic combustion byproducts also presents difficulties, and considerable effort has been directed to the problems of disposal or utilization of such materials. Such solid inorganic combustion byproducts contain substantial amounts of aluminum in oxidized form. Recovery of alumina from such solid combustion byproducts would be of value to the aluminum industry because such recovery would provide a constant source of alumina, which the United States primarily imports as raw material bauxite.

Accordingly, it is an object of the following intention to effectively remove sulfur dioxide from stack gases by an absorbant of a composition and of a nature such that it will provide a means of at least partial utilization of power plant waste materials such as flyash and slag.

It is a further object to provide methods which are adapted to produce a valuable byproduct together with the capturing and regeneration of sulfur dioxide. Various other objectives which may be realized through particular utilizations or specific embodiments of the present invention are to permit the use of higher sulfur coal to improve the economics of a coal burning facility; to utilize a waste material generated by the facility, i.e., flyash and slag as the source of the sulfur dioxide absorber thereby eliminating a significant part of the surface pollution created by the operation of the facility and to further improve the economics of the scrubbing process, to produce a valuable byproduct, $Al_2O_3 \cdot 3H_2O$, which is not sufficiently available in this country; to capture sulfur dioxide gas and regenerate it as a useable and saleable byproduct; and to enable regeneration of those reagents that are required to prepare the sulfur dioxide absorbant and regenerate it as a byproduct. These and other objects will become more apparent from the following detailed description and the accompanying drawings, of which:

FIG. 1 is a schematic representation of process steps of a particular embodiment of the present invention, and FIG. 2 is a graph of pH versus time in sulfur dioxide absorption in respect to an embodiment of the present process.

Generally, the present invention is directed to a process for removing sulfur dioxide from effluent oxidation product gas, such as stack gas mixtures from a coal burning power generating facility, in which the sulfur dioxide gas mixture is conducted into contact with an absorbant selected from the group consisting of an aqueous solution of alkali aluminate such as sodium aluminate, alkali silicate such as sodium silicate, and mixtures thereof to remove sulfur dioxide from the effluent gas and to produce a precipitate selected from the group consisting essentially of silica, alumina, and mixtures thereof. Further, in accordance with the method, an alkali leaching solution is provided for solubilization of silica and/or alumina values of power facility flyash to provide such absorbant, and in which such alkali leaching solution is regenerated and reused following recovery of such alumina and/or silica. The absorption process for sulfur dioxide can be closely regulated through monitoring and control of pH during the process.

In accordance with the present methods, alkali metal salts of orthosilicic acid, such as $Na_4SiO_4$ or alkali metal salts of aluminum hydroxide, such as sodium aluminate, $NaAlO_2$ (the hydrated form being written as $NaAl(OH)_4$), or a mixture of such salts are obtained from flyash or the like by extractive leaching, and the resultant alkali aluminate and/or silicate is utilized as an absorbant solution for the dual purposes of removing sulfur dioxide from the stack gases, and for precipitating alumina and/or silica for recovery and utilization thereof, as will be explained in more detail hereinafter. When utilizing flyash as a raw material in the process, it is advantageous to first remove the magnetic components from the flyash before extractive leaching thereof. These latter components, which may be removed by magnetic separative means, may contain the bulk of the iron or other non-aluminate metallic elements, and a considerable amount of the silica content of the flyash. The alumina content is preferentially retained in the non-magnetic portion of the flyash. The alumina content is particularly preferred constituent for recovery and utilization in accordance with the present method, and sodium hydroxide is particularly preferred as the alkali leaching agent for extraction of alumina from the flyash. The resulting sodium aluminate is the most favored absorber for sulfur dioxide in the process because the by-product aluminum hydroxide may in accordance with the present method be precipitated as the crystalline hydrate of aluminum oxide, gibbsite ($Al_2O_3 \cdot 3H_2O$), in accordance with conventional techniques whereas sodium silicate solutions used as the absorber for sulfur dioxide may result in undesirable colloidal or gelatinous byproduct systems. However, through the utilization of the present method, a high quality of crystalline aluminum hydroxide byproduct may be produced from power facility solid waste material, such as flyash or slag, concurrently with the removing of the sulfur dioxide from the stack gases. The United States is presently primarily dependent upon imports of bauxite for its aluminum industry, and the provision of an alternative, constant source of byproduct alumina may be of significant value to the domestic aluminum industry.

Turning now to FIG. 1, various aspects of the present invention will now be more particularly described with respect to the process embodiment there illustrated.

As shown in FIG. 1, a conventional power plant 10 which utilizes sulfur-containing coal as an energy source to provide electrical power also produces stack gases 101 containing sulfur dioxide and waste solid inorganic combustion byproduct in the form of flyash 100. The solid inorganic combustion byproduct will generally be in comminuted form having a particle size of less than about 50 mesh, and preferably less than about 80 mesh, which may comprise iron oxide, aluminum, oxide, silica and various silicates. The flyash 100 is passed through a conventional magnetic separator 102 to remove magnetic components 104, which may generally include iron and silica compounds. The magnetic separator 102 functions to conduct the flyash, for example by means of a conveyor belt or free fall, through a zone of high magnetic field to mechanically separate magnetic components from nonmagnetic components which are not affected by the magnetic field. The nonmagnetic residue 106 from the magnetic separation step, comprising aluminum and silica compounds (which are consequentially enriched in alumina bearing constituents) are subjected to an alkali leaching step to solubilize the desired alumina and/or silicate components of the nonmagnetic flyash process stream 106. The nonmagnetic flyash component 106 may be leached by continuous or batch procedures, and will generally be subjected to a caustic leaching agent at a pH of at least about 12 or more which leaching may be carried out with mechanical agitation and/or at elevated temprature in order to effect solubilization of the desired components in accordance with conventional techniques. By appropriate control of the leaching conditions, the relative amounts of alumina and silica which are solubilized may be controlled.

The leaching step 110 produces a liquid solution 108 comprising dissolved salts of the caustic leaching agent, which will preferably be sodium hydroxide. The soluble component 108 will desirably primarily comprise solubilized sodium aluminate, which will be used in subsequent steps of the process, as will be explained in more detail hereinafter. The sodium aluminate solution 108 will desirably comprise at least one weight percent sodium aluminate and will have a pH of at least about 12.

The flyash components which are not solubilized by alkali leaching step form a solid residue 110 which may be separated from the sodium aluminate solution 108 by appropriate means such as filtration, sedimentation and decantation, and/or centrifugation and may desirably include one or more washing steps to recover sodium aluminate or caustic solution associated therewith.

The sodium aluminate solution 108 is conducted to absorber scrubber 120, and is utilized therein as an absorbant solution to remove sulfur dioxide from the stack gases 101 of the coal-burning plant 10. In the absorption scrubber zone 120, the stack gases 101 are contacted with the sodium aluminate absorbant solution at a pH in the range of from about 12 to about 6 and a temperature in the range of from about 60° to about 90° C. Of course, optimization of the particular aluminate concentration and solids size distributiuon used in a particular application would be related to design parameters such as the type of scrubber used in the absorption zone and the type of alumina recovery apparatus. In this regard, the absorption zone 120 may comprise gas scrubber means adapted for use with sodium aluminate absorbant, such as conventional effluent gas "scrubber" equipment suitable for use with an aqueous absorbant solution or slurry. Examples of such apparatus are conventional venturi scrubber equipment and impingement plate counter current scrubber equipment.

The absorption of sulfur dioxide by the absorbant in the absorption zone 120 in accordance with the present method results in the consumption of the aluminate salts and causes the precipitation of alumina with the concomitant production of corresponding, soluble alkali sulfite salts. The process may be operated in a batch mode in which an absorbant charge is consumed until a predetermined condition is reached. The predetermined condition may be an indication of a reduction of the sulfur dioxide absorbing capacity of the absorbant slurry, such as the existence in the slurry of a pH value (i.e., about 5 or less) indicating the substantially complete consumption of the absorber. The absorption zone may then be recharged and the solution processed. The process may also be used in a continuously recyclic manner in which the absorber is replenished in the absorption zone during operation to replace that consumed by sulfur dioxide removal, and the alumina precipitate 118 produced is continuously removed. Such removal may be by appropriate centrifugation, sedimentation, and/or filtration apparatus.

Freshly precipitated aluminum hydroxide will gradually revert to the more stable crystalline gibbsite, $Al_2O_3 \cdot 3H_2O$ under appropriate conditions:

i.e., $2Al(OH)_3(s) \rightarrow Al_2O_3 \cdot 3H_2O\ (s)$

Both $CO_2$ and $SO_2$ gases are quite soluble at normal temperatures and form weak acids in aqueous solution:

$CO_2(g) + H_2O \rightarrow H_2CO_3$ $SO_2(g) + H_2O \rightarrow H_2SO_3$

These acids ionize slightly in water as indicated in the following reactions:

$H_2SO_3 + H_2O \rightarrow H_3O^+ + HSO_3^-;\ Ka = 1.7 \times 10^{-2}$ at 25° C.

$H_2CO_3 + H_2O \rightarrow H_3O^+ + HCO_3^-;\ Ka = 3 \times 10^{-7}$ at 25° C.

The sulfurous acid, $H_2SO_3$, is a much stronger acid than carbonic acid, $H_2CO_3$, and thus will dominate in the ionic equilibria involved with aqueous mixtures of the two acis.

In the process described herein, the above factors are applied in a manner which may be utilized to result in an effective substantially quantitative process. An operating temperature range of 70°–90° C. is particularly favorable in the provision of a crystalline alumina product. It has been shown that the process readily lends itself to pH monitoring and control.

The fundamental reactions for the absorption (scrubbing) process are as follows, using $Na_4SiO_4$ and $NaAlO_2$ solutions as examples of the absorbant materials:

$Na_4SiO_4 + 2SO_2(g) + 2H_2O \rightarrow 2Na_2SO_3 + H_4SiO_4(s)$ $Na_4SiO_4 + 2CO_2(g) + 2H_2O \rightarrow 2Na_2CO_3 + H_4SiO_4(s)$ $2NaAlO_2 + SO_2(g) + 3H_2O \rightarrow 2Al(OH)_3(s) + Na_2SO_3$ or $2NaAl(OH)_4 + SO_2(g) \rightarrow H_2O + 2Al(OH)_3(s) + Na_2SO_3$ $2NaAlO_2 + CO_2(g) + 3H_2O \rightarrow 2Al(OH)_3(s) + Na_2CO_3$ Increased pressures promote the indicated reactions, and utilization of increased reactant partial pressures or super atmospheric may be utilized if desired. It should be understood that further addition of $SO_2$ or $CO_2$ in the respective examples will produce secondary equilibrium reactions over definite pH ranges.

i.e., $Na_2SO_3 + SO_2(g) + H_2O \rightarrow 2NaHSO_3$ $Na_2CO_3 + CO_2(g) + H_2O \rightarrow 2NaHCO_3$ If during the scrubbing process, all of the $Na_2SO_3$ or $Na_2CO_3$ has been converted to $NaHSO_3$ or $NaHCO_3$; then $SO_2$ and $CO_2$ will appear in the tail gases and are easily identified. Hydrolysis of $HSO_3^-$ or $HCO_3^-$ ions is not a problem therein as these reactions do not proceed to any appreciable extent under the operating conditions of the present process.

An important feature of the present method is that aluminum sulfite, $Al_2(SO_3)_3$ and aluminum carbonate, $Al_2(CO_3)_3$ do not form as precipitates under the operating conditions of the process, as they hydrolyze substantially completely under these conditions.

Graphs of comparative and representative tests of various operational aspects of the present method are shown in FIG. 2 in order to demonstrate that the $SO_2$ is preferentially absorbed over the $CO_2$ under the operating conditions of the process, but it should be clearly understood that a consecutive absorber may be used to absorb carbon dioxide in a similar manner if that is desired.

It also should be apparent that the following ionic aqueous reactions may be applied to accomplish precipitation of $Al(OH)_3$.

$NaHSO_3 + NaAlO_2 + H_2O \rightarrow Na_2SO_3 + Al(OH)_3(s)$
or $[NaAl(OH)_4]$ $$NaHCO_3 + NaAlO_2 + H_2O \rightarrow Na_2CO_3 + Al(OH)_3(s)$$

$$2AlCl_3 + 3Na_2CO_3 + 3H_2O \rightarrow 2Al(OH)_3(s) + 6NaCl + 3CO_2(g)$$

$$Al_2(SO_4)_3 + Na_2CO_3 + 3H_2O \rightarrow 2Al(OH)_3(s) + 3Na_2SO_4 + 3CO_2(g)$$

$$2AlCl_3 + 6NaHCO_3 \rightarrow 2Al(OH)_3(s) + 6NaCl + 6CO_2(g)$$

Bergelius has shown that hydrated aluminum oxide can be precipitated from alum solutions using sodium carbonate solution, $Na_2CO_3$.

The aluminum hydroxide produced during the absorption of $SO_2$ by the process disclosed herein is brought down in the crystalline form of aluminum oxide known as gibbsite by conventional methods. This facilitates the separation step of removing the $Al(OH)_3$ solid from the solution of the othe products of the scrubbing step.

The sulfur dioxide is substantially completely removed from the stack gases, so the tail gas 112 exiting from the scrubber 120 is substantially free of sulfur dioxide. The absorption system is demonstrated by the curves of FIG. 2.

The absorption of the sulfur dioxide results in precipitation of solid phase alumina 118 ($Al_2O_3.3H_2O$), and concomitant production of sodium sulfite and/or sodium bisulfite liquid stream 122 from the absorber solution, as the sulfurous acid displaces the weaker amphoteric anion. The absorbant solution is maintained at a temperature of more than about 70° C. by the latent heat of the stack gases, or by auxiliary heating so that the alumina precipitates in desirable form. The solid phase alumina 118 may be separated from the liquid phase 120 by filtration or other suitable separation procedures.

The sulfite liquid stream 122 is conducted to a gas regeneration zone 124, where it is contacted in batch or continuous operational mode with an acid stronger than sulfurous acid, such as sulfuric acid 126, to remove sulfur dioxide gas stream 130, and to provide a sulfate salt product stream 132 which may comprise an aqueous solution of sodium sulfate and/or sodium bisulfate. This sulfate solution will desirably be at least 0.5 molar in sulfate.

The $SO_2$ may be recovered by acidification of the resulting solution of $Na_2SO_3$ and $NaHSO_3$ which was separated from the gibbsite by the addition of sulfuric acid, keeping the pH of the solution below pH=1, and the temperature in the 70°–90° C. range. The liberated $SO_2$ gas is collected and processed as a byproduct. The $Na_2SO_4$ and $NaHSO_4$ solution obtained as a result of acidification with $H_2SO_4$ may be electrolyzed to produce a sodium hydroxide solution at the cathode and a sulfuric acid solution at the anode, which may be recyclically utilized in the method.

As indicated, the sulfate solution 132 is in turn conducted to an electrolysis cell 134, where through application of relatively inexpensive on-site power from the power station 10, a recyclic sodium hydroxide solution 136 together with hydrogen gas is provided at the cathode cell of the cell 134, and a recyclic sulfuric acid solution 138 together with oxygen gas, is provided at the anode cell of the electrolysis cell 134. The hydrogen and oxygen gases may be recovered as valuable byproducts. The sodium hydroxide solution 136 is conducted to the alkali leaching station as the caustic agent of the alkali leachant, and the sulfuric acid 138 is conducted to the gas regeneration station as the strong acid for displacement of the sulfurous acid.

If the application does not involve the leaching of flyash to obtain $NaAlO_2$ solution, the absorbant $NaAlO_2$ solution may alternatively be regenerated by one of several methods:

(1) the pecipitated $Al(OH)_3$ may be collected and dissolved in excess NaOH.

(2) the slurry of $Al(OH)_3(s)$; $Na_2SO_3$ and $NaHSO_3$ may be acidified with $H_2SO_4$ to liberate the $SO_2$ for removal as a gas and to dissolve the $Al(OH)_3(s)$ and then the $Al_2(SO_4)_3$, $Na_2SO_4$ and $NaHSO_4$ solution may be electrolyzed to produce $NaAlO_2$ at the cathode and sulfuric acid at the anode. Residual sulfate salts will not interfere with recycling for $SO_2$ absorption.

This latter application of the process permits a recycling of products to reactants for the absorption step while concurrently giving a byproduct $SO_2$ gas.

As long as $SO_2$ is present in the gas stream to the absorber, carbonate and bicarbonate formation do not take place at a pH less than 7, and accordingly such pH control should be utilized in preferred embodiments of the method in which it is desired to absorb the sulfur dioxide component of stack gas, but not the carbon dioxide component.

In this regard, solutions of $Na_2CO_3$ varying between 0.0 to 14.5% (saturated) by weight have pH values from 10.1 to 10.9 to 25° C. and solutions of $NaHCO_3$ varying between 0.0 to 9.5% (saturated) by weight have pH values from 7.8 to 8.5 at 25° C.

A one molar solution of $Na_2CO_3$ (pH=10.5) was sulfited by constant addition of $SO_2$ gas while the temperature was at or slightly above 70° C. The pH dropped gradually as sulfiting continued until a pH of 3 was reached. At this point, $SO_2$ was detected in the tail gas. Prior to this time and pH no $SO_2$ had been detected in the tail gas. $CO_2$ gas was continually detected in the tail gas from the beginning of the sulfiting process.

As an example of the scrubbing process, a solution of sodium aluminate to be used for scrubbing $SO_2$ from or absorbing $SO_2$ from a gas mixture continuing 22% by volume of $SO_2$ in air is prepared having a concentration of 0.2 moles per liter of solution. 200 ml of this absorber solution is placed in a column reactor fitted with a gas dispersion tube and a heating jacket. The temperature of the scrubber is brought to 70° C., the gas mixture as described above is sparged into the scrubber through the dispersion tube at 90 ml per minute measured at 1 atmosphere and at 25° C. The pH of the system and the temperature are monitored. Samples are taken at 5 minute intervals and the pH and time recorded. When the pH reaches 6, the process is discontinued. The crystaline aluminum oxide is separated from the solution by filtration and washed. The solution of $Na_2SO_3$ and $NaHSO_3$ is sent to $SO_2$ recovery.

It will be appreciated from the present disclosure that in accordance with the present invention, methods are provided for recovery and utilization of orthosilicic acid, $H_4SiO_4$ of metasilicic acid, $H_2SiO_3$, of such amphoteric substance as aluminum hydroxide, $Al(OH)_3$, also such amphoteric substances as tin IV hydroxide, $Sn(OH)_4$, and zinc hydroxide, $Zn(OH)_2$, while removing sulfur dioxide from combustion byproduct effluent gas streams.

While the present invention has been specifically described with reference to the specific embodiment illustrated in the drawings, it will be appreciated that various modifications, adaptations and variations will be apparent from the present disclosure, and are intended to be within the spirit and scope of the present invention as set forth in the following claims.

Various of the features of the invention are set forth in the following claims.

What is claimed is:

1. A process for removing sulfur dioxide from effluent oxidation product gas and for recovering amphoteric components from solid inorganic combustion byproducts of coal combustion of a coal burning power generating facility comprising the steps of leaching said solid inorganic combustion byproducts with an aqueous caustic leachant solution having a pH of at least about 12 to provide an alkali solubilized salt solution comprising alkali-solubilized amphoteric combustion byproduct components selected from the group consisting of alkali aluminates as an absorber solution, contacting said effluent gas with said absorber solution at a solution temperature in the range of from about 60° to about 90° centigrade while maintaining the pH of said absorber solution in the range of from about 12 to about 6 to remove sulfur dioxide from the effluent gas and to produce a precipitate of said amphoteric inorganic combustion byproduct components and an alkali sulfite salt solution.

recovering said precipitate by separating said precipitate from said alkali sulfite salt solution, acidifying the alkali sulfite salt solution after separation of said amphoteric inorganic combustion byproduct precipitate to recover sulfur dioxide from said solution, and to produce an alkali salt solution, electrolytically recovering an aqueous caustic leachant solution from said alkali salt solution, and recycling said caustic leachant to leach solid inorganic amphoteric combustion byproducts from said power generation facility to provide an alkali solubilized amphoteric salt absorber solution.

2. A process in accordance with claim 1 wherein said caustic leachant is aqueous sodium hydroxide solution, wherein said alkali solubilized amphoteric salt solution predominantly comprises sodium aluminate, solution and wherein said effluent gas is contacted with said absorber solution at a temperature of at least about 70° C. and at a pH of less than about 7 to suppress carbonate formation in the absorber solution while maintaining sulfur dioxide absorption capacity.

3. A process in accordance with claim 2 wherein said precipitate is predominantly selected from the group consisting of alumina, aluminum hydroxide or mixtures thereof.

4. A process in accordance with claim 3 wherein said precipitate is predominantly crystalline gibbsite.

5. A process in accordance with claim 4 further including the step of magnetically separating magnetic components from said solid inorganic combustion byproduct prior to said leaching step to provide an alumina-enriched inorganic combustion byproduct for leaching by said caustic leachant solution, and wherein said inorganic combustion byproduct is coal combustion flyash.

6. A process in accordance with claim 1 wherein said alkali leaching solution is sodium hydroxide solution, wherein said alkali sulfite acidification step is carried out by adding sulfuric acid to said alkali sulfite solution, and wherein said sulfuric acid is electrolytically regenerated for recyclic reuse concommitantly with electrolytic regeneration of said caustic leachant.

* * * * *